United States Patent
Chiu (10) Patent No.: US 7,991,429 B2
(45) Date of Patent: *Aug. 2, 2011

(54) COMMUNICATION SYSTEM EQUIPPED WITH SHARED ANTENNA AND CIRCUIT BOARD THEREOF

(75) Inventor: Wei-Chuan Chiu, Taipei (TW)

(73) Assignee: ASUSTeK Computer Inc., Peitou, Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/704,536

(22) Filed: Feb. 12, 2010

(65) Prior Publication Data

US 2010/0144276 A1    Jun. 10, 2010

Related U.S. Application Data

(63) Continuation of application No. 11/802,704, filed on May 24, 2007, now Pat. No. 7,702,360.

(30) Foreign Application Priority Data

Jun. 23, 2006 (TW) .............................. 95122655 A (51) Int. Cl.
*H04B 7/00* (2006.01)

(52) U.S. Cl. .................................... 455/552.1

(58) Field of Classification Search ............ 455/550.1, 455/552.1, 553.1, 575.1, 575.3, 575.4, 575.5, 455/90.1, 41.1, 41.2; 343/702

See application file for complete search history.

(56) References Cited

U.S. PATENT DOCUMENTS

| | | | |
|---|---|---|---|
| 6,628,236 B2 | 9/2003 | Kim | |
| 7,444,175 B2 * | 10/2008 | Ito et al. | 455/575.3 |
| 2003/0050032 A1 | 3/2003 | Masaki | |
| 2006/0160563 A1 * | 7/2006 | Ku | 455/552.1 |
| 2008/0064436 A1 | 3/2008 | Kim | |
| 2008/0227485 A1 | 9/2008 | Kim | |

FOREIGN PATENT DOCUMENTS

| | | |
|---|---|---|
| CN | 1741484 A | 3/2006 |
| TW | 479385 | 3/2002 |
| TW | 532020 | 5/2003 |
| TW | M260886 | 4/2005 |
| TW | I255613 | 5/2006 |

* cited by examiner

*Primary Examiner* — Thanh C Le
(74) *Attorney, Agent, or Firm* — Winston Hsu; Scott Margo (57) ABSTRACT

A communication system equipped with a shared antenna includes an antenna, a first communication module, a second communication module, and a switch module. The first communication module processes a first communication signal and transmits the first communication signal to the switch module. The second communication module processes a second communication signal and transmits the second communication signal to the switch module. Additionally, the first communication module controls the switch module to transmit the first communication signal or the second communication signal to the antenna, and the antenna emits the first communication signal or the second communication signal.

7 Claims, 8 Drawing Sheets

COMMUNICATION SYSTEM EQUIPPED WITH SHARED ANTENNA AND CIRCUIT BOARD THEREOF

CROSS REFERENCE TO RELATED APPLICATIONS

This is a continuation application of Ser. No. 11/802,704, now pending, filed on May 24, 2007.

BACKGROUND OF THE INVENTION

1. Field of the Invention

The present invention relates to a communication system, and more particularly to a communication system equipped with an antenna shared by a Bluetooth module and a wireless network module.

2. Description of the Prior Art

Figure 1:
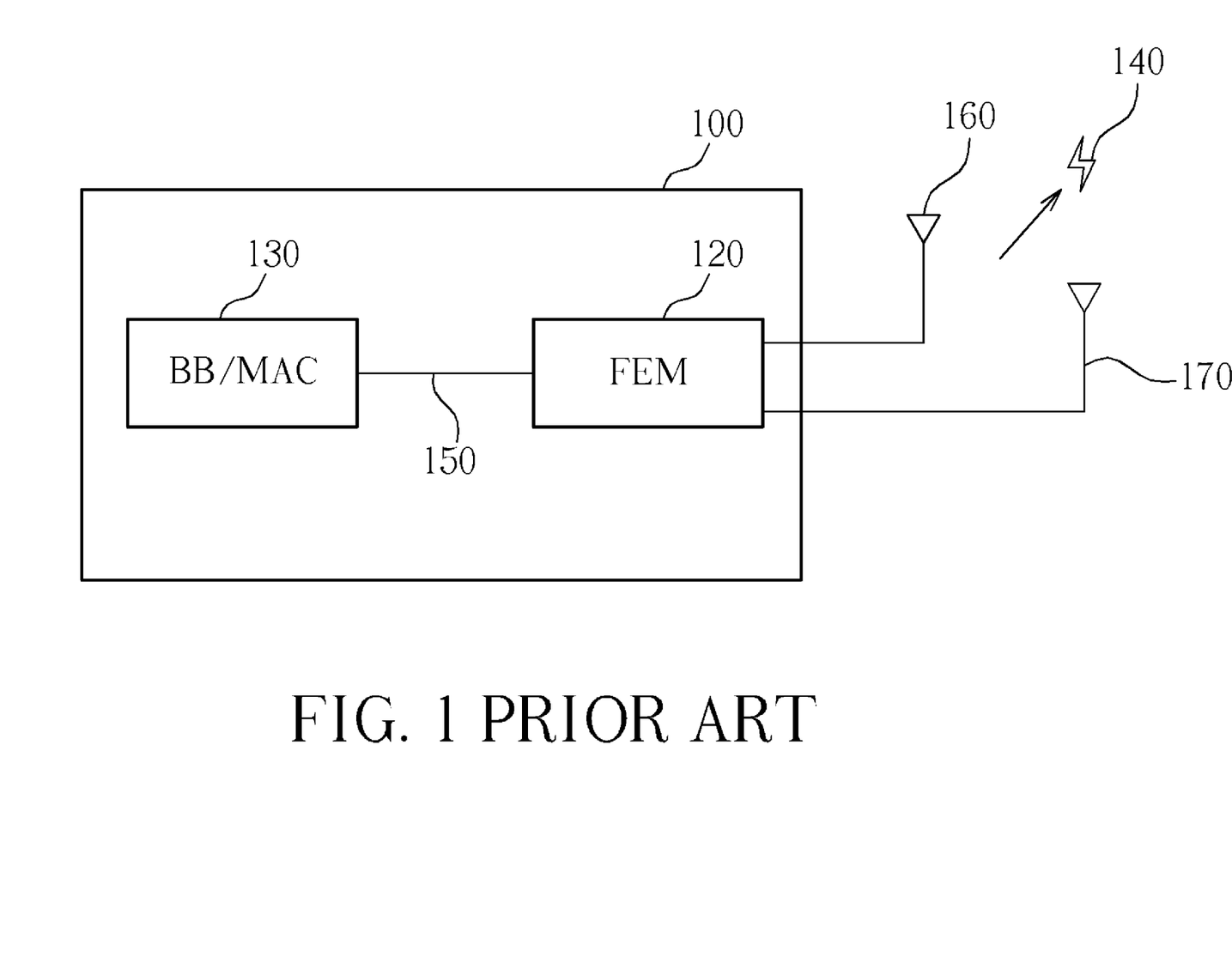
FIG. 1 illustrates a diagram of a convention wireless network module.

FIG. 1 illustrates a diagram of a convention wireless network module 100. The wireless network module 100 includes a baseband/multimedia access control (BB/MAC) 130, a front end module (FEM) 120, a main antenna 160, and an auxiliary antenna 170.

The above-mentioned wireless network module 100 is manufactured compliant to the 802.11b/g IEEE standards that transmit wireless network signals 140 at a bandwidth of 2.4 GHz. The main antenna 160 and the auxiliary antenna 170 are coupled to the FEM 120, and the FEM 120 is coupled to the BB/MAC 130. The FEM 120 is utilized for converting the digital signals 150 transmitted from the BB/MAC 130 to wireless network signals 140 to be transmitted by the main antenna 160 or the auxiliary antenna 170.

When the wireless network module 100 is transmitting the wireless network signals 140, the wireless network module 100 selects an antenna to be a transmission antenna according to the reception of the main antenna 160 or the auxiliary antenna 170, the transmission antenna becomes a diversity antenna. In other words, there is usually a predetermined distance set between positions of the main antenna 160 and the auxiliary antenna 170, thus the wireless network module 100 can gain better reception through the inter-compensation of the main antenna 160 and the auxiliary antenna 170. Therefore when the main antenna 160 has better reception, the wireless network module 100 will transmit the wireless network signals 140 through the main antenna 160; and if the auxiliary antenna 170 has better reception, the wireless network module 100 will transmit the wireless network signals 140 through the auxiliary antenna 170.

Figure 2:
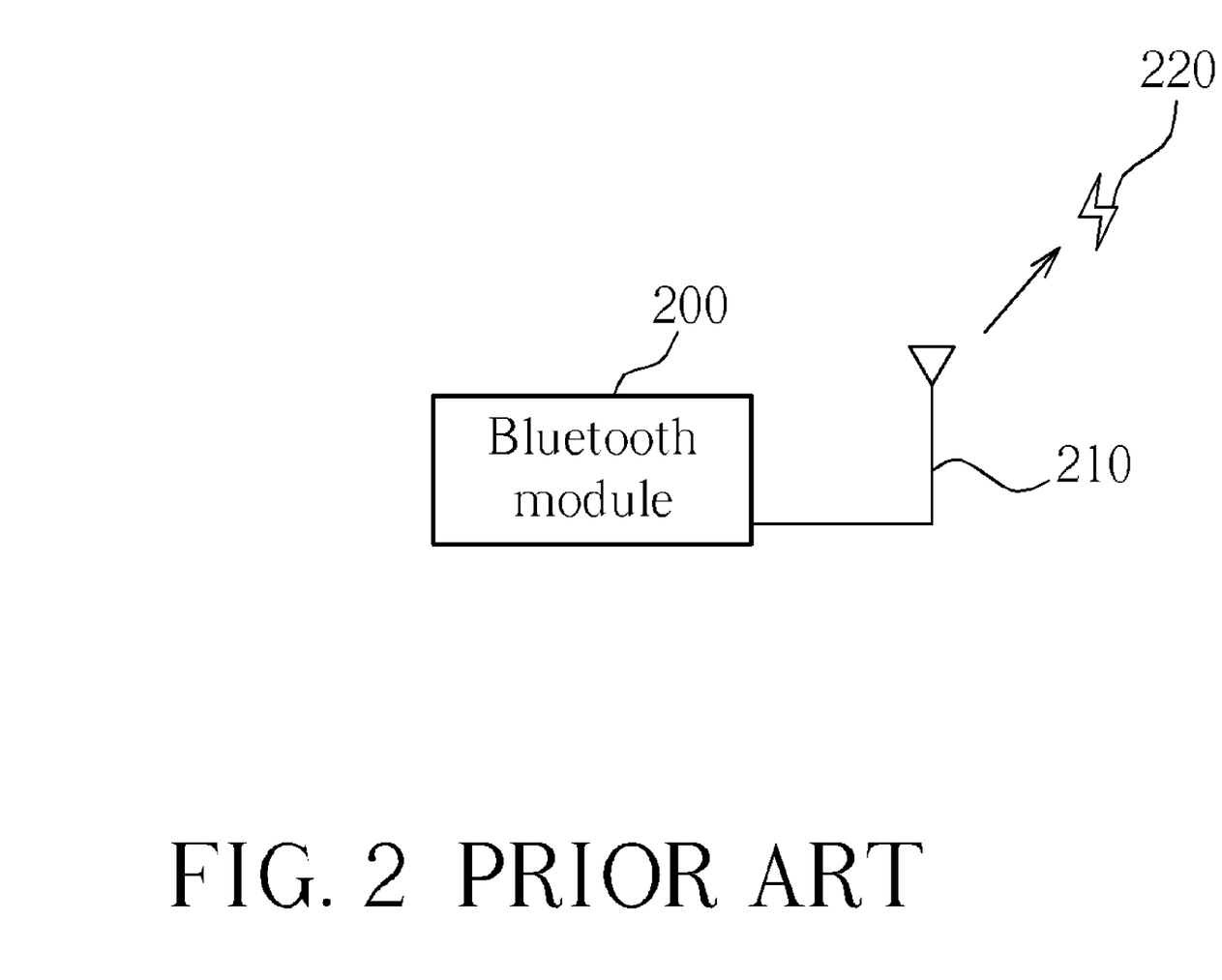
FIG. 2 illustrates a diagram of a conventional Bluetooth module.

FIG. 2 illustrates a diagram of a conventional Bluetooth module 200. The Bluetooth module 200 includes a Bluetooth antenna 210 for transmitting Bluetooth signals 220, wherein Bluetooth signals 220 transmitted by the Bluetooth module 200 also operate in the bandwidth of 2.4 GHz.

In general, the current wireless network module and the Bluetooth module are respectively installed on two different printed circuit boards. For example, the wireless network cards sold in the market only provide either a wireless network module or a Bluetooth module. Therefore, in consideration for an end-user, to utilize both wireless network transmission and Bluetooth transmission at the same time requires additional expenses and inconvenience is caused, especially when the two wireless network cards are of different standards.

At the moment, some mobile phones in the market have the wireless network module and the Bluetooth module installed on the printed circuit board of the mobile phone. In other words, the wireless network module and the Bluetooth module are installed on the same printed circuit board. However, the resulting efficiency will be poor as the wireless network module of this design only utilizes a single antenna, and the Bluetooth module utilizes a chip antenna.

SUMMARY OF THE INVENTION

The claimed invention provides a communication system and an circuit board equipped with a shared antenna to solve the above-mentioned problem.

The claimed invention discloses a circuit board suitable for cooperating to a first antenna. The circuit board comprises a first communication module for processing a first communication signal; a second communication module for processing a second communication signal; and a switch module enabled to the first communication module and the second communication module respectively, wherein the switch module is enabled to the first antenna, and the switch module switches the first communication module or the second communication module through the first antenna to transit the first communication signal or the second communication signal.

The claimed invention further discloses a communication system with a shared antenna. The communication system comprises a shared antenna; a first communication module for processing a first communication signal; a second communication module enabled to the first communication module for processing a second communication signal and for receiving a first control signal transmitted from the first communication module; and a switch module. The switch module comprises a first transmission end enabled to the first communication module for transmitting the first communication signal; a second transmission end enabled to the second communication module for transmitting the second communication signal; a first control end enabled to the first communication module for receiving the first control signal transmitted from the first communication module; and a third transmission end enabled to the shard antenna for enabling to the first transmission end or the second transmission end according to the first control signal.

The claimed invention further discloses a communication system with a shared antenna, the communication system comprises a first antenna; a first communication module for processing a first communication signal; a second communication module for processing a second communication signal; a second shared antenna enabled to the second communication module for transmitting the second communication signal; and a switch module. The switch module comprises a first transmitting end enabled to the first communication module for transmitting the first communication signal; a second transmitting end enabled to the second communication module for transmitting the second communication signal; a first control end enabled to the first communication module for receiving the first control signal transmitted from the first communication module; and a third transmitting end enabled to the first antenna for enabling to the first transmission end or the second transmission end according to the first control signal.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
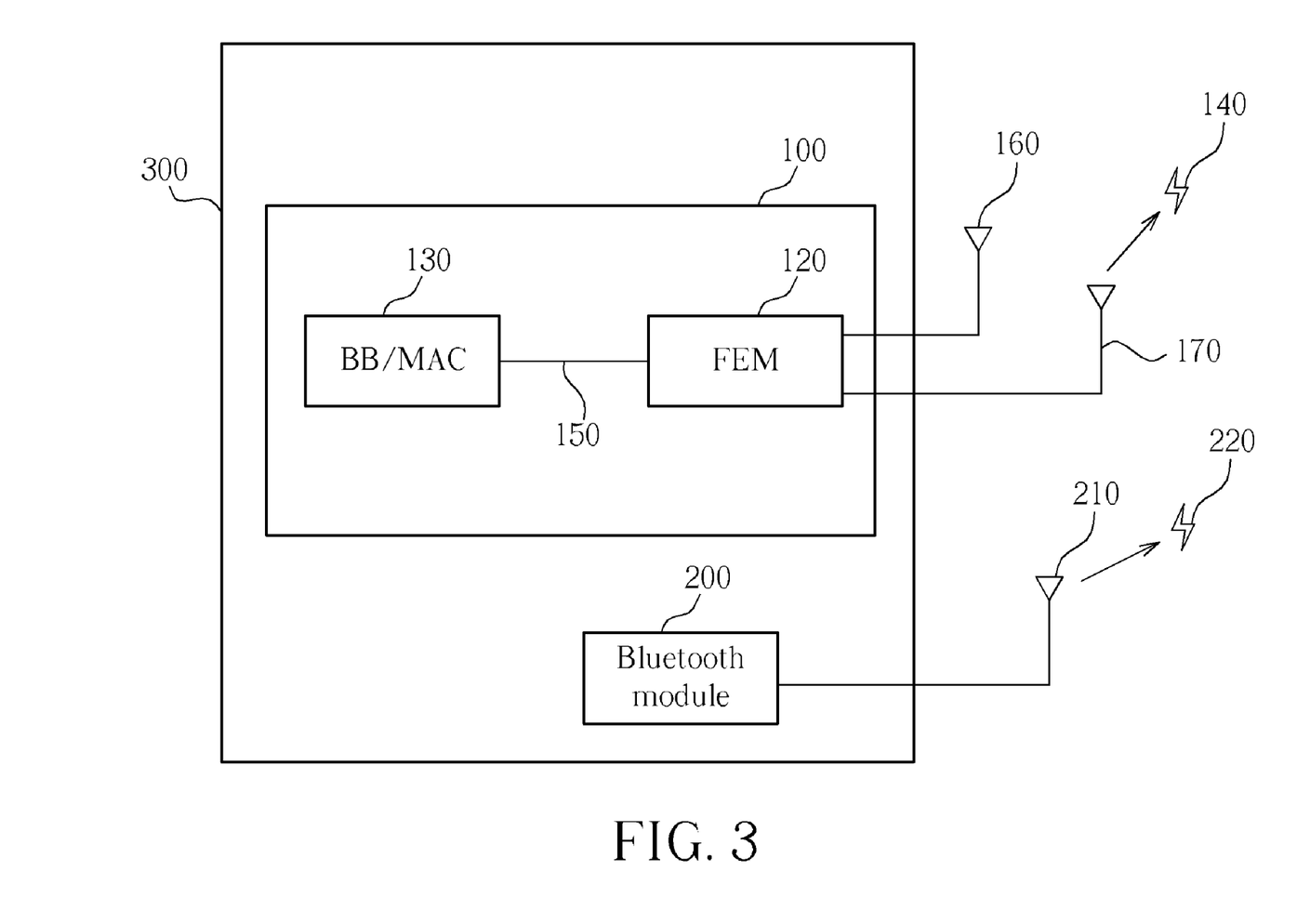
FIG. 3 illustrates a diagram of a communication system according to an embodiment of the present invention.

The present invention is made to solve the problem in the prior art, and to combine the wireless network module and the Bluetooth module on a single printed circuit board. FIG. 3 illustrates a diagram of a communication system 300 according to an embodiment of the present invention. The communication system 300 includes a wireless network module 100 and a Bluetooth module 200. The wireless network module 100 includes a baseband/multimedia access control (BB/MAC) 130, a Front end module (FEM) 120, a main antenna 160, and an auxiliary antenna 170.

The operational method and the connection of the internal components of the wireless network module 100 and the Bluetooth module 200 are similar to FIG. 1, therefore it will not be reiterated. From the above-mentioned, both the wireless network signals 140 transmitted from the wireless network module 100 and the Bluetooth signals 200 transmitted from the Bluetooth module 200 operate in the 2.4 GHz bandwidth. However, when the wireless transmission and receiving range of the wireless network module 100 and the Bluetooth module 200 overlaps, an interference phenomenon will occur, such as a normal interference or a front-end overload.

A normal interference usually occurs on a baseband processor, this is due to the wireless network module 100 and the Bluetooth module 200 not knowing each other's bandwidth, which leads to the two primary frequencies being overlapping on the same channel. The front-end overload occurs when two wireless systems do not keep a certain distance from each other, in other words, it is caused by when isolation of the antenna ends are not sufficient, or a harmonic interference is generated when transmission level is too great from both the wireless systems.

Therefore, when the communication system 300 is being designed, interference can be easily generated due to the insufficient antenna gap between the main antenna 160 of the wireless network module 100, the auxiliary antenna 170, and the Bluetooth antenna 210 of the Bluetooth module 200, hence the transmission efficiency is reduced.

Figure 4:
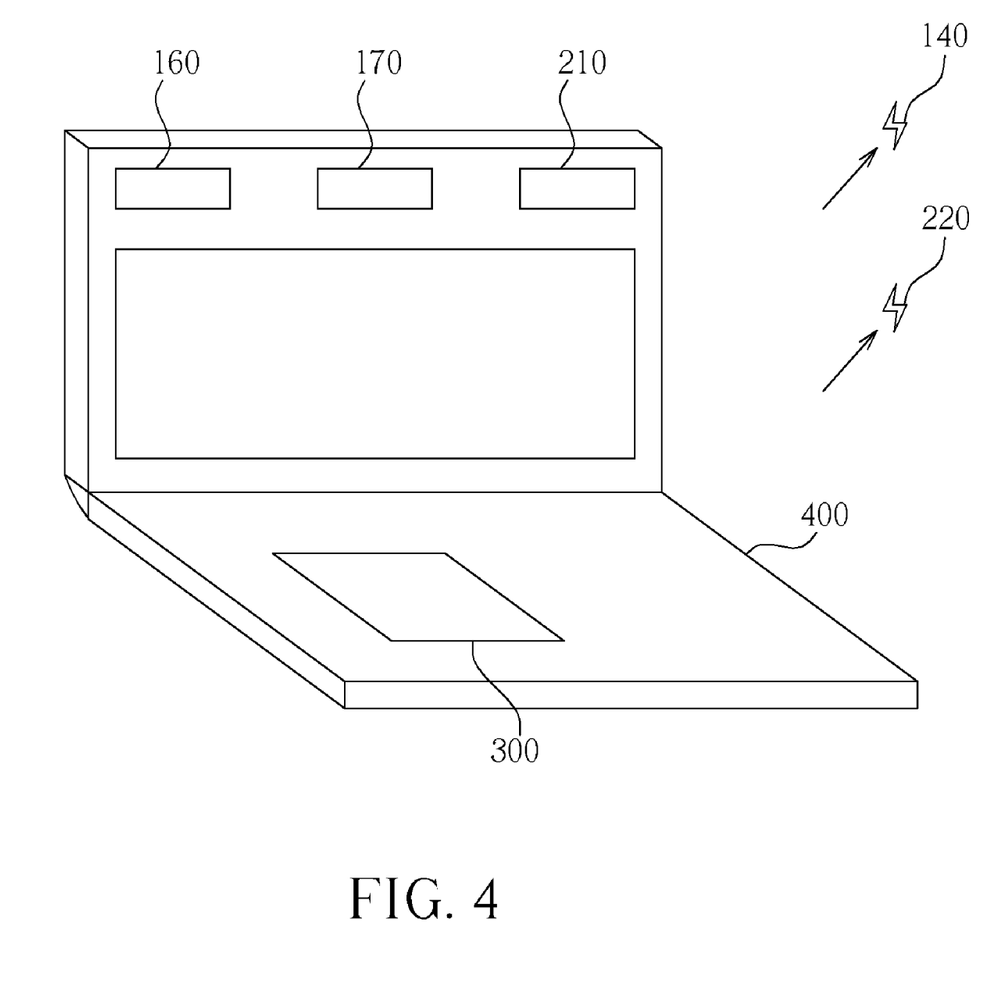
FIG. 4 illustrates a diagram of a communication system being applied in a notebook computer.

FIG. 4 illustrates a diagram of a communication system 300 being applied in a notebook computer 400. In this embodiment, the notebook computer 400 may not have a wireless network module and a Bluetooth module installed, an circuit board that includes a wireless network module and a Bluetooth module can be installed into the notebook computer 400, yet in other embodiments, the communication system 300 can be directly installed on the motherboard of the notebook computer 400.

Whether the communication system 300 is directly installed on the notebook computer 400 or is installed within the circuit board, three antennas are required for receiving and transmitting signals. As the antenna installed on the monitor of the notebook computer 400 will have a better reception, therefore the main antenna 160 of the wireless network module and the auxiliary antenna 170, and the Bluetooth antenna 210 of the Bluetooth module will be installed on the sides of the monitor so that the communication system 300 can transmit the wireless network signals 140 and the Bluetooth signals 220 through the antennas on the top of the monitor.

However, if the installation of main antenna 160, the auxiliary antenna 170, and the Bluetooth antenna 210 on the top end of the monitor will generate an insufficient gap phenomenon at the antenna end such that the communication system 300 at the same time transmits the wireless network signals and Bluetooth signals that can easily cause interference and affect the transmission efficiency.

Therefore, if the number of antennas can be reduced such that the gap degree of the antennas is compliant to 25 dB, 30 dB, or 40 dB, hence there will be better transmission efficiency.

Figure 5:
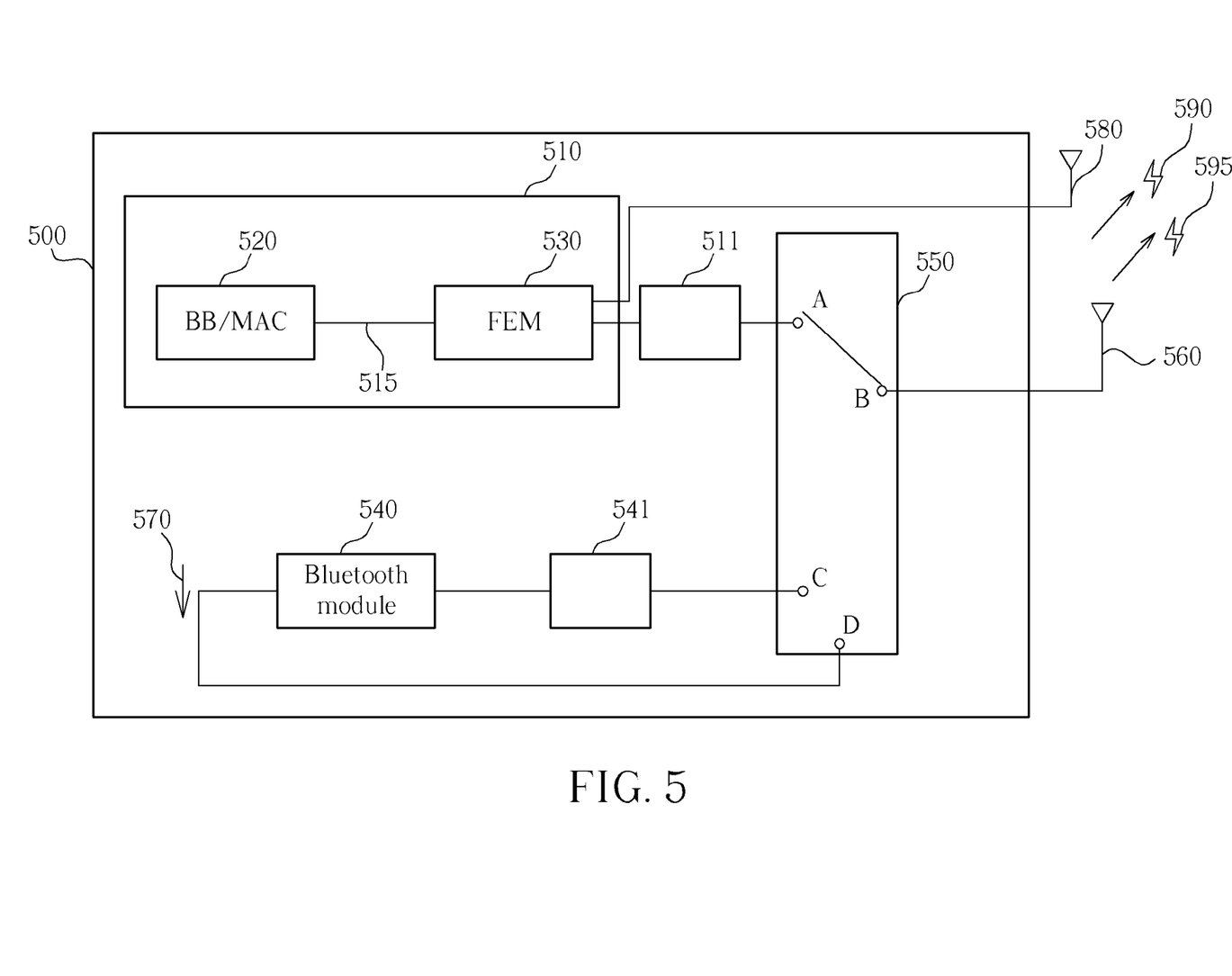
FIG. 5 illustrates a functional block diagram of a communication system according to the first embodiment of the present invention.

Please refer to FIG. 5 for an explanation of a first embodiment of the present invention. FIG. 5 illustrates a functional block diagram of a communication system 500 according to the first embodiment of the present invention. The communication system 500 includes a wireless network module 510, two signal quality enhancers 511 and 541, a Bluetooth module 540, a switch module 550, a first antenna 580, and a second antenna 560, where the wireless network module 510 includes a BB/MAC 520 and a FEM 530, and the switch module 550 includes a control end D and transmission ends A, B, and C.

The BB/MAC 520 is enabled to the FEM 530 for transmitting digital signals 515 to the FEM 530. The FEM 530 is enabled to the transmission end A of the switch module 550 through the signal quality enhancer 511 for converting the digital signals 515 to wireless network signals 590 to be transmitted to the switch module 550; the FEM 530 is also enabled to the first antenna 580 for transmitting the wireless network signals 590 to the first antenna 580, which to be transmitted. The signal quality enhancer 511 is enabled between the FEM 530 and the transmission end A of the switch module 550.

The Bluetooth module 540 is enabled to the transmission end C of the switch module 550 through the signal quality enhancer 541 for transmitting Bluetooth signals 595 to the switch module 550; the Bluetooth module 540 is also enabled to the control end D of the switch module 550 for transmitting a control signal 570 to the control end D of the switch module 550. The signal quality enhancer 541 is enabled between the Bluetooth module 540 and the transmission end C of the switch module 550.

In this embodiment, the switch module 550 turns on and off for 2.4 GHz RF, but in other embodiments, the switch module 550 can also be a switch module that can switch RF signals.

In this embodiment, the signal quality enhancers 511 and 541 are utilized for enhancing signal quality, for example: the signal quality enhancer 511 is utilized for enhancing the wireless network signal quality, and the signal quality enhancer 541 is utilized for enhancing the Bluetooth signal quality. In this embodiment, the signal quality enhancer 511 and 541 can be filters, but in other embodiments, the signal quality enhancer 511 can be an amplifier, or other equivalent device similar to the signal quality enhancer. In other embodiments, if the wireless network signal quality and the Bluetooth quality are satisfactory, then the signal quality enhancers 511 and 541 can be removed, and the FEM 530 can be directly enabled to the transmission end A of the switch module 550, and also the Bluetooth module 540 can be directly enabled to the transmission end C of the switch module 550.

As illustrated in FIG. 5, before the Bluetooth module 540 transmits the Bluetooth signals 595 (when the Bluetooth module 540 is inactive), the transmission ends A and B of the switch module 550 are enabled (the transmission end C will not be enabled to the transmission end B). Therefore, in FIG. 5, the FEM 530 is enabled to the second antenna 560 through the switch module 550. Therefore, the wireless network module 510 can transmit the wireless network signals 590 through the first antenna 580 and the second antenna 560. The wireless network module 510 can determine whether the wireless networks signals 590 will be transmitted through the first antenna 580 or the second antenna 560 according to the reception of the first antenna 580 and the second antenna 560.

When the Bluetooth module 540 is transmitting the Bluetooth signals 595, the Bluetooth module 540 will transmit the control signal 570 to the control end D of the switch module 550 such that the transmission end C of the switch module 550 is enabled to the transmission end B of the switch module 550 (at the time, the transmission end A will not be enabled to the transmission end B). Therefore, the Bluetooth module 540 can be enabled to the second antenna 560 through the switch module 550 to transmit the Bluetooth signals 595. At this time, the wireless network module 510 can transmit the wireless network signals 590 through the first antenna 580.

Furthermore, the communication system 500 provided by the preferred embodiment is designed within a printed circuit board 501, and the printed circuit board 501 is a PCI express card. The express card can be inserted into a PCI express slot of the notebook computer so that the notebook computer has the functions of wireless network (802.11b/g) and Bluetooth transmission. In the other embodiments, the communication system 500 can be designed within a motherboard of a portable electronic device.

Therefore, the first embodiment of the present invention can solve the interference problem by the two signals (wireless network signals and Bluetooth signals) in the conventional communication system. Furthermore, a communication system 600 provided by the preferred embodiment can reduce number of antennas through a switching method of the multiplier so that the design of the gap degree between the antennas can be simplified, and the interference phenomenon of the wireless network signals and the Bluetooth signals can be reduced so as to increase transmission efficiency.

Figure 6:
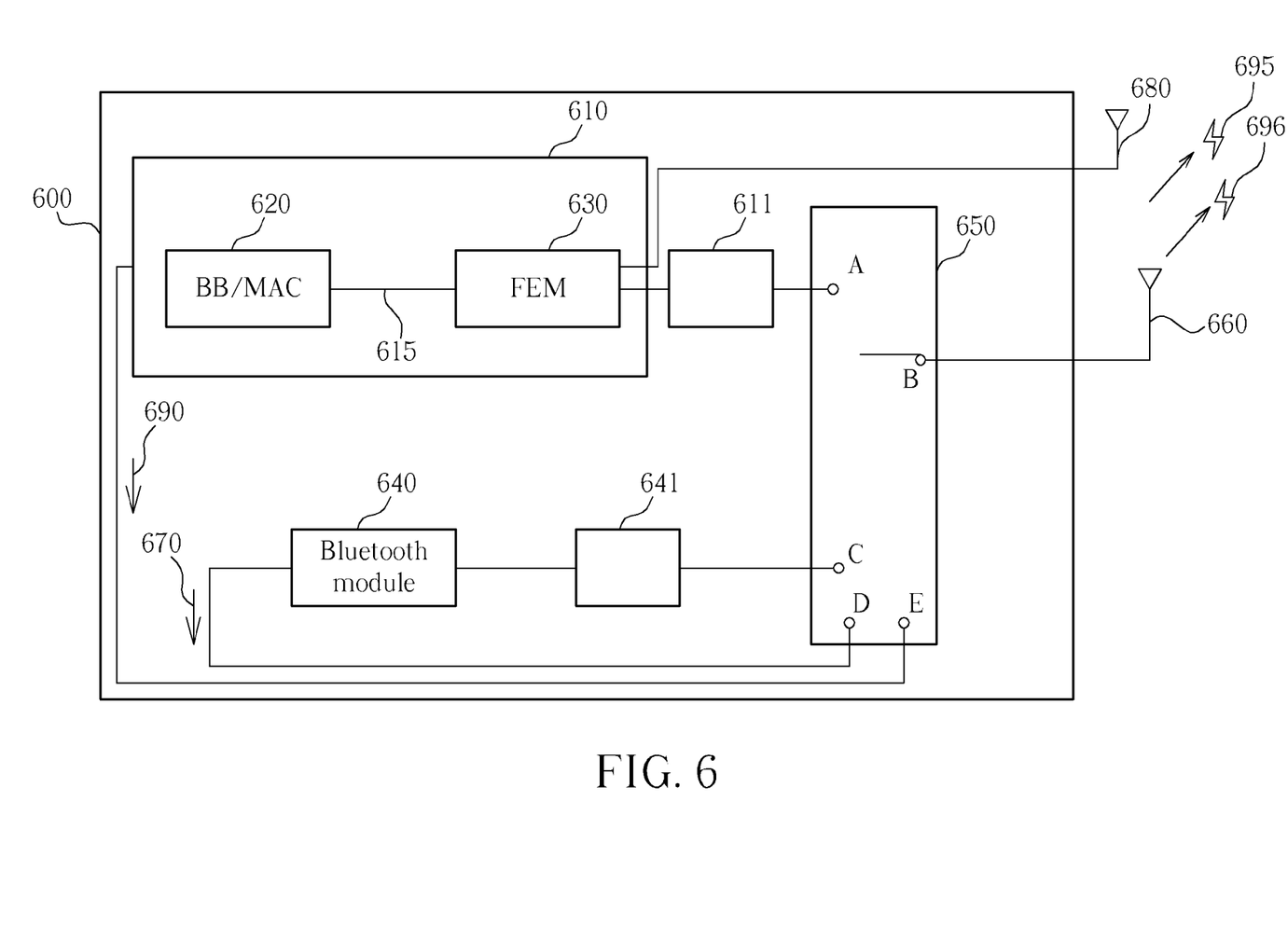
FIG. 6 illustrates a diagram of a communication system according to a second embodiment of the present invention.

FIG. 6 illustrates a diagram of a communication system 600 according to a second embodiment of the present invention. The communication system 600 includes a wireless network module 610, two signal quality enhancers 611 and 641, a Bluetooth module 640, a switch module 650, a first antenna 680, and a second antenna 660, where the wireless network module 610 includes a BB/MAC 620 and a FEM 630, and the switch module 650 includes control ends D and E, and transmission ends A, B, and C.

The connections and functions of the components disclosed in the above-mentioned embodiment are similar to the first embodiment, except that the wireless network module 610 is enabled to the control end E of the switch module 650 to transmit an active control signal 690 to the control end E of the switch module 650.

As illustrated in FIG. 6, before the wireless network module 610 and the Bluetooth module 640 respectively transmit the wireless network signals 695 and the Bluetooth signals 696, the transmission end B of the switch module 650 may not be enabled to the transmission ends A and C. When the wireless network module 610 is transmitting the wireless network signals 695, the wireless network module 610 will transmit the control signal 690 to the control end E of the switch module 650 such that the transmission end B is enabled to the transmission end A and also the FEM 630 can be enabled to the second antenna 660 through the switch module 650. Thus the wireless network module 610 can transmit the wireless network signals 695 through the first antenna 680 or the second antenna 660, in other words, the wireless network module 610 can determine whether the wireless networks signals 695 will be transmitted through the first antenna 680 or the second antenna 660 according to the reception of the first antenna 680 and the second antenna 660.

When the Bluetooth module 640 is transmitting the Bluetooth signals 696, the Bluetooth module 640 will transmit a control signal 670 to the control end D of the switch module 650 such that the transmission end C is enabled to the transmission end B of the switch module 650. Therefore the Bluetooth module 640 can be enabled to the second antenna 660 through the switch module 650 to transmit the Bluetooth signals 696.

Please note that in this preferred embodiment, when the wireless network module 610 and the Bluetooth module 640 respectively transmit the wireless network signals 695 and the Bluetooth module 696 at the same time, the wireless network module 610 and the Bluetooth module 640 will respectively transmit the control signals 690 and 670 to the control ends E and D of the switch module 650. At this time, after the switch module 650 receives the control signals 690 and 670, the switch module 650 executes the switch so that the transmission end B is enabled to the transmission end C, hence the Bluetooth module 640 can transmit the Bluetooth signal 696 through the second antenna 660, and the wireless network module 610 can still transmit the wireless network signals 695 through the first antenna 680.

In other words, in this preferred embodiment, priority of the Bluetooth module 640 utilizing the second antenna 660 is higher than the wireless network module 610. The reason for the design is that the main application of the Bluetooth module 640 is the transmission of voice signals, and the main application of the wireless network module 610 is the transmission of data. Also the priority of transmitting voice signals is usually higher than the priority of transmitting data in order to prevent the voice signals from being interrupted during broadcast. Therefore, the Bluetooth module 640 has a higher priority in utilizing the second antenna 660.

In other embodiments, other conditions are taken into consideration, such that the wireless network module 610 has a higher priority to utilize the second antenna 660. Then if the switch module 650 at the same time receives the control signals 690 and 670, the switch module 650 will enable the transmission end B to the transmission end A.

Therefore the communication system 600 provided by the preferred embodiment can reduce the number of antennas through a switching method of the switch module so that the design of the gap degree between the antennas can be simplified, and the interference phenomenon of the wireless network signals and the Bluetooth signals can be reduced.

Figure 7:
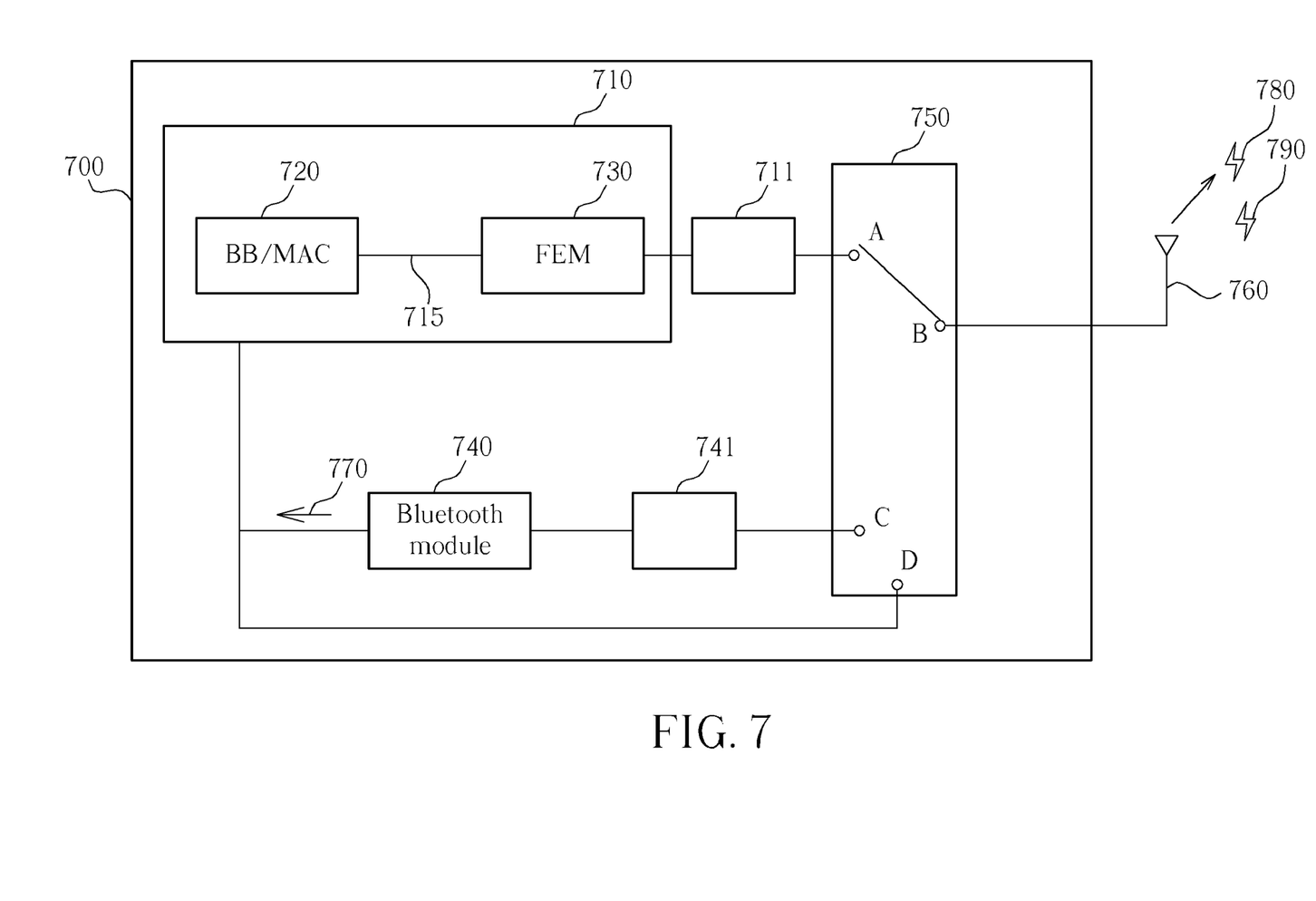
FIG. 7 illustrates a diagram of a communication system according to a third embodiment of the present invention.

FIG. 7 illustrates a diagram of a communication system 700 according to a third embodiment of the present invention. The communication system 700 includes a wireless network module 710, two signal quality enhancers 711 and 741, a Bluetooth module 740, a switch module 750, an antenna 760, where the wireless network module 710 includes a BB/MAC 720 and a FEM 730, and the switch module 750 includes a control end D, and transmission ends A, B, and C.

The connections and functions of the components disclosed in the above-mentioned embodiment are similar to the first embodiment, except that the design of the above-mentioned embodiment utilizes a single antenna design, therefore the wireless network module 710 and the Bluetooth module 740 are only enabled to the control end D of the switch module 750. Furthermore, in the initial stage (when the Bluetooth module 740 is not transmitting the Bluetooth signals 790, and the Bluetooth module 740 is inactive), the transmission end A of the switch module 550 is enabled to the transmission end B (the transmission C is not enabled to the transmission B). Hence the FEM 730 can be enabled to the antenna 760 through the switch module 750, therefore the wireless network module 710 can transmit the wireless network signals 780 through the antenna 760.

When the Bluetooth module 740 is transmitting the Bluetooth signals 790, the Bluetooth module 740 will transmit a control signal 770 to the control end D of the switch module 750 and the wireless network module 710. After the switch module 750 receives the control signals 770, the switch module 750 will enable the transmission end C to the transmission end B (at this time, the transmission end A is not enabled to the transmission end B). Furthermore, the control signal 770 at the same time also notifies the wireless network module 710 to temporarily stop transmitting the wireless network signals 780. Whereby the Bluetooth module 740 can be enabled to the antenna 760 through the switch module 750 to transmit the Bluetooth signals 790.

Figure 8:
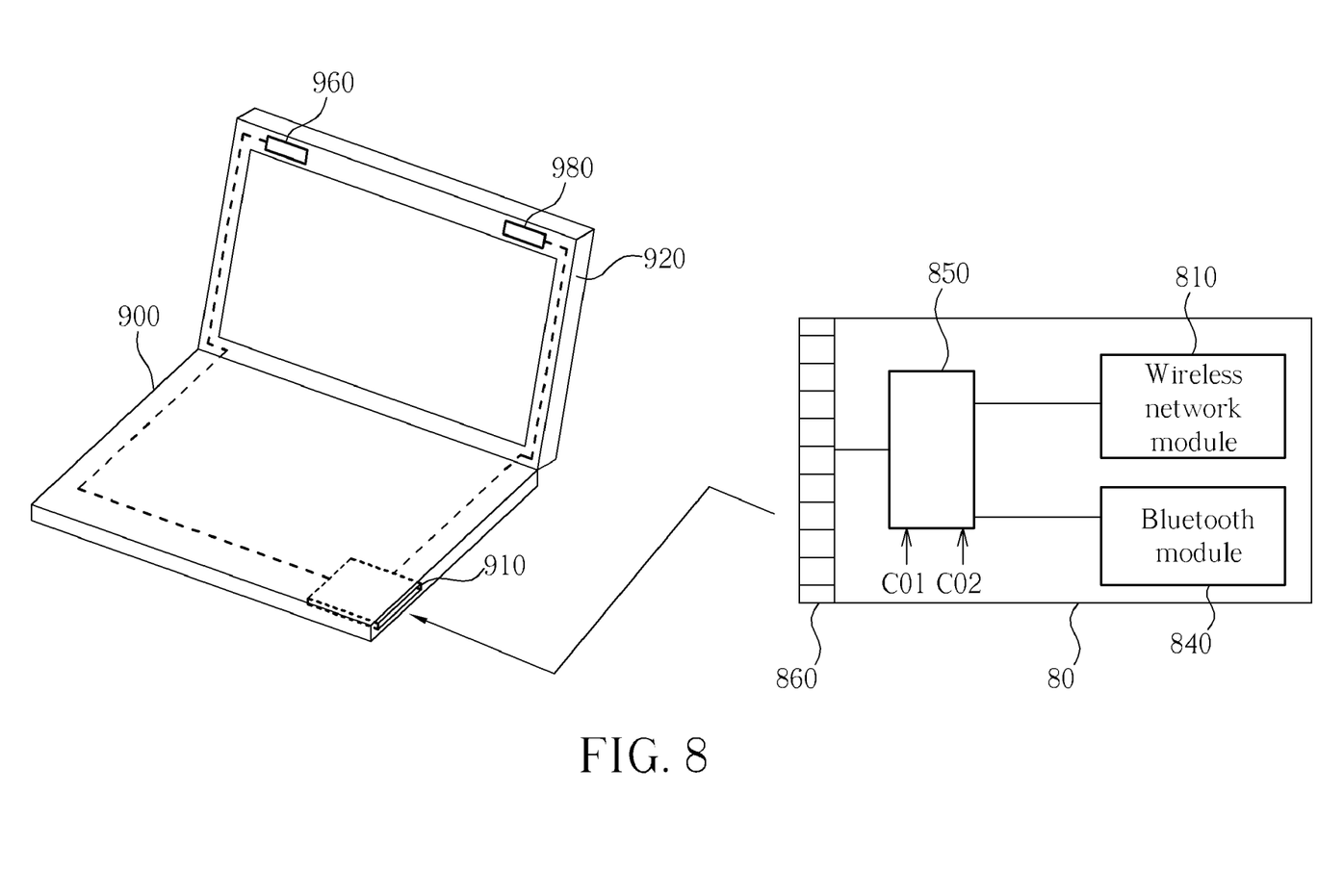
FIG. 8 illustrates a diagram of a circuit board according to a fourth embodiment of the present invention.

The wireless network module, the Bluetooth module, and the switch module of the above-mentioned embodiment can be integrated within an circuit board. Please refer to FIG. 8 for further explanation. FIG. 8 illustrates a diagram of an circuit board according to a fourth embodiment of the present invention.

As illustrated in FIG. 8, an circuit board 80 includes a wireless network module 810, a Bluetooth module 840, a switch module 850, and an interface module 860. In this embodiment, the circuit board 80 is a PCI Express card, while in other embodiments, the circuit board 80 can be a PCMCIA card or other types of circuit board.

The above-mentioned wireless network module 810 is respectively enabled to the switch module 850 and the interface module 860. The switch module 850 is respectively enabled to the wireless network module 810, the Bluetooth module 840, and the interface module 860.

The above-mentioned circuit board 80 is utilized for inserting into an expansion slot 910 of a portable electronic device 900. A first antenna 960 and a second antenna 980 are installed on a monitor 920 of the portable electronic device 900. The first antenna 960 and the second antenna 980 are installed on a top end of the monitor 920, and the first antenna 960 and the second antenna 980 are enabled to the expansion slot 910. In this embodiment, the portable electronic device 900 can be a laptop or notebook computer, a palmtop, a tablet PC, an origami, or a personal digital assistant (PDA).

When the circuit board 80 is inserted into the expansion slot 910 of the portable electronic device 900, the Bluetooth module 840 is enabled to the first antenna 960 through the switch module 850, the interface module 860, and the expansion slot 910, whereby either the wireless network module 810 or the Bluetooth module 840 can transmit the Bluetooth signals or the wireless network signals through a switching method of the switch module 850 and through the first antenna 960.

Furthermore, when the circuit board 80 is inserted into the expansion slot 910, the wireless network module 810 is enabled to the second antenna 980 through the interface module 860 and the expansion slot 910, therefore the wireless network module 810 can transmit the wireless network signals through the second antenna 980. When the quality of the wireless network signals transmitted by the wireless network module 810 through the second antenna 980 is bad, the wireless network module 810 will output a control signal CO2 to the switch module 850 to control the switching of the switch module 850 so that the wireless network module 810 can transmit the wireless network signals through the first antenna 960.

Next, if the Bluetooth module 840 intends to transmit the Bluetooth signals through the first antenna 960, then the Bluetooth module 840 will output a first control signal CO1 to the switch module 850 to control the switching of the switch module 850 so that the Bluetooth module 840 can transmit the Bluetooth signals through the first antenna 960. Thus the wireless network module 810 can process the wireless networks through the second antenna 980, and the Bluetooth module 840 can process the Bluetooth signals through the first antenna 960.

Through the design of this embodiment, the number of antennas can be reduced, and the portable electronic device 900 requires only the first antenna 960 and the second antenna 980 to be installed on each side on the top end of the monitor 920. In this way, the positioning problem of the first antenna 960 and the second antenna 980 can be solved, and also the interference problem between the wireless signals can be solved.

In conclusion, the communication system provided by the above-mentioned embodiment utilizes the switch module to control the transmission and receiving of the antennas. Hence the number of antennas can be reduced, and also the interference phenomenon of the wireless network signals and the Bluetooth signals can be prevented.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication system with a shared antenna, the communication system comprising:
   an antenna;
   a first communication module for processing a first communication signal;
   a second communication module enabled to the first communication module for processing a second communication signal and for receiving a first control signal transmitted from the first communication module; and
   a switch module comprising:
     a first transmission end enabled to the first communication module for transmitting the first communication signal;
     a second transmission end enabled to the second communication module for transmitting the second communication signal;
     a first control end enabled to the first communication module for receiving the first control signal transmitted from the first communication module; and
     a third transmission end enabled to the antenna for coupling to the first transmission end or the second transmission end according to the first control signal.

2. The communication system of claim 1 wherein the first communication module is a Bluetooth module.

3. The communication system of claim 1 wherein the second communication module is a wireless network module.

4. A communication system with a shared antenna, the communication system comprising:
   a first antenna;

a first communication module for processing a first communication signal;
a second communication module for processing a second communication signal;
a second antenna enabled to the second communication module for transmitting the second communication signal; and
a switch module comprising:
   a first transmitting end enabled to the first communication module for transmitting the first communication signal;
   a second transmitting end enabled to the second communication module for transmitting the second communication signal;
   a first control end enabled to the first communication module for receiving the first control signal transmitted from the first communication module; and
   a third transmitting end enabled to the first antenna for coupling to the first transmission end or the second transmission end according to the first control signal.

5. The communication system of claim 4 wherein the first communication module is a Bluetooth module.

6. The communication system of claim 4 wherein the second communication module is a wireless network module.

7. The communication system of claim 4 wherein the switch module further comprises a second control end enabled to the second communication module for receiving a second control signal transmitted from the second communication module so that the third transmission end enables to the first transmission end or the second transmission end according to the first control signal and the second control signal.

* * * * *